(No Model.) 2 Sheets—Sheet 1.

DE WITT WEST.
BAND CUTTER AND FEEDER.

No. 407,803. Patented July 30, 1889.

WITNESSES
Edwin L. Yewell
Jos. A. Ryan

INVENTOR
Dewitt West
By John G. Manahan
his Attorney

N. PETERS, Photo-Lithographer, Washington, D. C.

(No Model.)  2 Sheets—Sheet 2.
DE WITT WEST.
BAND CUTTER AND FEEDER.
No. 407,803. Patented July 30, 1889.
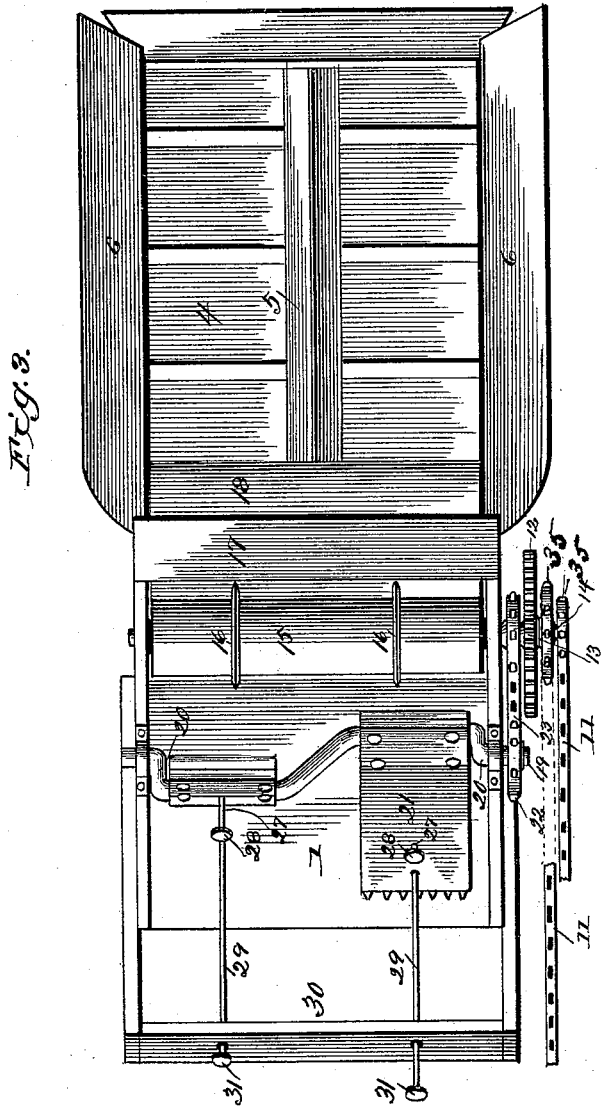
WITNESSES
Edwin T. Yewell
Jos. C. Ryan
INVENTOR
Dewitt West
By John G. Manahan
his Attorney

UNITED STATES PATENT OFFICE.

DE WITT WEST, OF TAMPICO, ILLINOIS.

BAND-CUTTER AND FEEDER.

SPECIFICATION forming part of Letters Patent No. 407,803, dated July 30, 1889.

Application filed February 24, 1888. Serial No. 265,097. (No model.)

*To all whom it may concern:*

Be it known that I, DE WITT WEST, a citizen of the United States, residing at Tampico, in the county of Whiteside and State of Illinois, have invented certain new and useful Improvements in Band-Cutters and Feeders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to band-cutters and feeders; and it consists of the construction and relation of mechanism, hereinafter described, for the purpose of automatically cutting bands and feeding unbound or loose hay or straw or like material.

In my invention the ultimate mechanism which delivers the unthrashed grain and straw to the cylinder is so constructed as that its operation and movements are substantially reproductions of that of the hands and arms as feeders.

Figure 1:
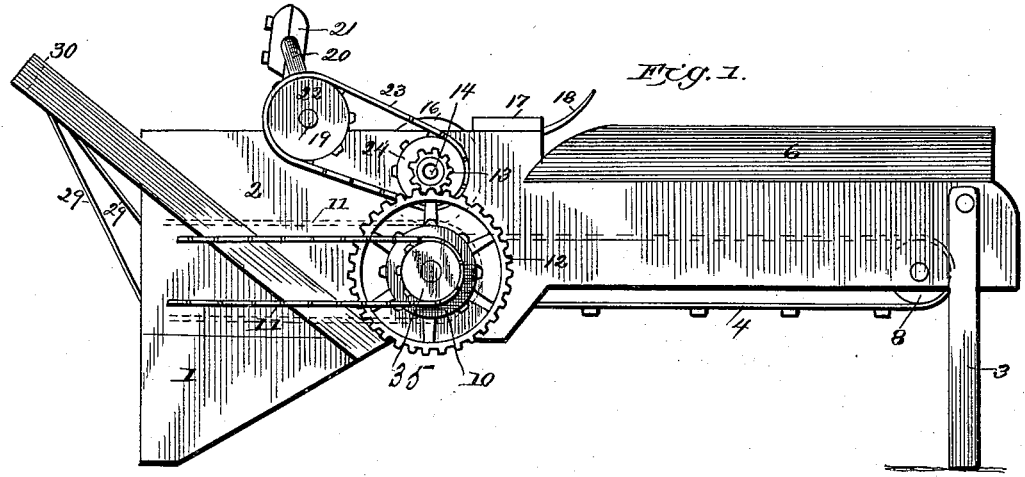
Figure 2:
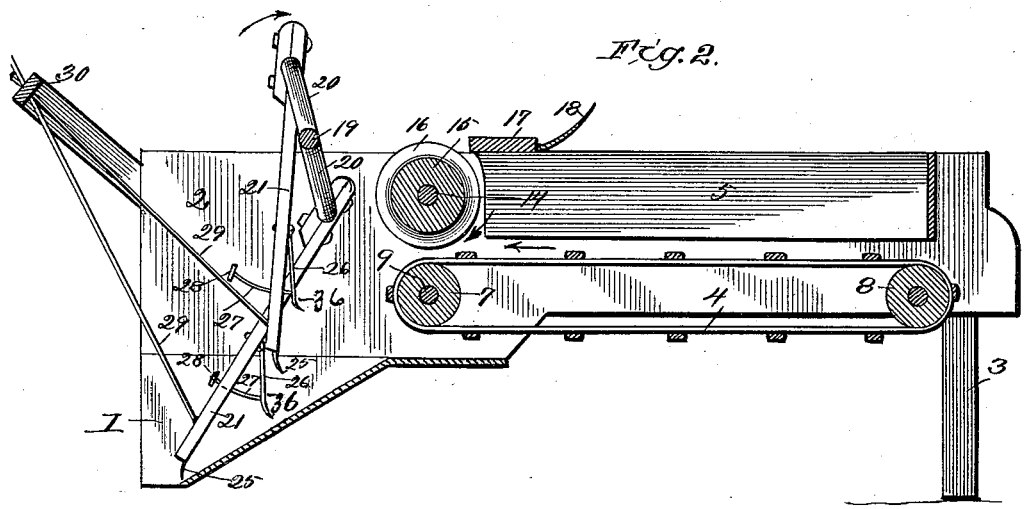

In the drawings, Figure 1 is a side elevation of a machine embodying my invention. Fig. 2 is a longitudinal section thereof, showing the position and relation of the internal mechanism. Fig. 3 is a plan view.

1 is the front end of the spout or throat of an ordinary thrashing-machine, through which the grain is fed to the thrashing-cylinder, the latter being located at the lower end of said spout. My machine can be attached to said spout with any of the well-known formations of hooks and staples, and by the provision of a bar or longitudinal rod placed at each side of the deck of the thrasher and projected at their outer or front ends within suitable eyes formed on the exterior of the frame of my invention the latter can be loaded and held on the thrasher by merely sliding it in on said rods.

2 is a frame containing and supporting my device, and when in operation is supported at its inner end on the throat 1 and at its outer end by legs 3, which, for convenience in transportation, can be hinged at their upper ends on the frame 2, so as to be adapted for folding.

The frame 2 at a portion of its outer end is provided with a carrying-apron 4. The apron 4 is of such width as when a longitudinal partition 5 is placed centrally over the same there will be room at each side of said partition on said apron for the largest sheaves to lie longitudinally on said apron between said partition and the sides of the frame 2.

The partition 5 is provided with sides which slope downwardly and outwardly, and the upper edges of the frame 2 are provided with inwardly-declining shelvings 6, to assist the sheaves when pitched thereon in assuming a horizontal and longitudinal position upon the apron 4. The latter is carried upon the inner roller 7 and outer roller 8, the inner roller 7 being driven, as hereinafter described, from some suitable rotating shaft of the thrashing-machine. The roller 7 is rigidly attached to a transverse rotating shaft 9, suitably journaled in the frame 2 and projected beyond the outer walls of the latter, and there provided with inner sprocket-wheel 10 and outer sprocket-wheel 35 of different sizes, each of which carries and is driven by a chain 11, the latter being carried and driven by variantly-sized sprocket-wheels loosely seated on the outer end of some suitable shaft of the thrasher and adapted by the use of the ordinary clutch to be rigidly locked optionally to the latter shaft. By the optional use of one or the other of the chains 11 a variant speed can be given to the apron 4, so as to adjust the speed thereof to different qualities of grain. A gear-wheel 12 is also seated on the outer end of the shaft 9 within the sprocket-wheels 10, and is adapted to engage and rotate a pinion 13, seated on the transverse shaft 14, journaled in the frame 2 above shaft 9.

On shaft 14, within the frame 2, is rigidly placed a roller 15, the lower surface of which moves toward the thrasher with the upper surface of the roller 7, and has the function of pressing the grain down upon the latter roller, and thereby insuring its discharge therefrom. Around the periphery of the roller 15 are seated circular band-cutters 16. The cutters 16 are placed on the roller 15, so as to be respectively in line with the center of the beds between the partition 5 and sides of the frame 2, and project from the roller 15 to sufficient proximity with the apron 4 on roller 7 to force their way almost entirely through the sheaf as it passes under said cutters, and thereby insure the severance of the band. The velocity of the cutters 16 being greater than that of apron 4, said cutters have a draw cut which increases their efficiency.

In feeding loose grain the partition 5 is removed and such grain pitched directly upon the apron 4. The roller 15 is run at a greater velocity than the apron 4, and has the effect therefore of accelerating the upper portion of the unthrashed grain as it passes thereunder, and thereby more thoroughly distribute the same. A transverse cap 17, having an upwardly-extending front 18, is placed across the frame 2 above in front of the position of the rollers 7 and 15, to insure the ready passage of the grain to and between the said rollers.

On the frame 2, near its inner end, and between the discharge end of the apron 4 and the thrashing-cylinder, is seated transversely the double-crank shaft 19. On the respective crank-wrists 20 of the shaft 19 are pivoted the upper ends of the downwardly-extending feeders 21, the lower end of which project downward and within the feed-throat 1 of the thrasher, and are adapted to engage the unthrashed grain as it is delivered from the rollers 15 and 7, and push and force such grain down to and within reach of the thrashing-cylinder of the thrashing-machine, the latter being located in the usual relation to said throat 1. The crank-shaft 19 is rotated by means of a sprocket-wheel 22, rigidly seated thereon externally to the frame 2 and rotated by a sprocket-chain 23, the latter being carried and driven by and from a sprocket-wheel 24, seated externally on the shaft 14. Each of the arms 21 is provided at its lower end with downward and slightly backwardly-projecting tines 25, adapted to intermittently engage and push forward the unthrashed grain. To the lower surface of the arms 21, respectively, are attached one or more downwardly-extending arms 26, pivoted at their upper ends to the rear or under sides of the arms 21, and furnished at their lower extremities with like tines 36 to engage the grain. The arms 26 are further adjustably attached to the arms 21 by means of rods 27, which are pivotally attached to and project from the upper surface of the arms 26, near the lower end thereof, loosely through the arms 21, and the rods 27 are provided with the head 28 at their projected ends, which prevents their withdrawal from the arms 21. The pivotal connection of the arms 21 and 26 permits the arms 26 to rise in passing backward over the grain and permits them to drop to engage the latter in their forward or inner movement, and the function of the rods 27 and head 28 is to prevent the lower ends of arms 26, when at or near the limit of their inner thrust, from approaching so near the throat 1 as to allow the tines 36 to come in contact with said floor, it being obvious that the head 28 will prevent arms 26 from dropping beyond a certain distance from arms 21. The arms 21 are likewise suspended adjustably, so as not to come in contact with the floor-throat 1, by means of rods 29, pivotally attached at their lower ends to the front upper surface of the arms 21 and project diagonally upward and inward, and project loosely through the superposed transverse brace 30, and are provided at their upper ends with the head 31, which head prevents the withdrawal of rods 29 and keeps the lower ends of arms 21 from contact with the floor of the throat 1. The loose seating of the rods 29 in the bar 30 permits the upward thrust of the rods 29 and the rising of the arms 21 when carried backward over the grain. The location and position of the arms 21 and 26 are such that said arms in their forward movement pass down into the grain and carry the same along with them; but in their backward movement they are withdrawn from the grain and carried back over the same to a convenient point of engagement.

The crank-wrists 20 are projected from the axis of shaft 19 in opposite directions, so that the arms 21 act alternately, and thereby not only make the feed continuous, but operate to clean and force the grain from each other during their withdrawal.

The shaft 19 may be constructed to oscillate or rock instead of rotate; but I think the rotation thereof as shown is preferable. The tines 25 may be integral with their respective arms, and arms 26 may be short forks pivoted, as shown.

What I claim as my invention, and desire to secure by Letters Patent of the United States, is—

1. In a band-cutter and feeder, the combination of the crank-shaft 19, arms 21, pivotally attached thereto at or near their upper ends, and provided with tines 25 at their lower ends, arms 26, provided with tines 36, pivotally attached to the under sides of the arms 21, the rods 27, having the heads 28 pivotally attached to the arms 26, the perforated bar 30, and the rods 29, provided with heads 31, pivotally attached at their lower ends to the lower ends of the arms 21 and with their upper ends passing loosely through the perforations in the bar 30, substantially as described.

2. In a band-cutter and feeder, the combination of the throat 1, frame 2, shaft 19, suitably journaled transversely on said frame, arms 21, pivotally attached at or near their upper ends to the crank-wrists 20 of said shaft, and provided with tines 25 at their lower ends, the perforated bar 30, and the rods 29, provided with heads 31, pivotally attached at their lower ends to the lower ends of the arms 21, and with their upper ends passing loosely through the perforations in the bar 30, and suitable means for rotating said shaft 19, substantially as shown, and for the purpose described.

In testimony whereof I affix my signature in presence of two witnesses.

DE WITT WEST.

Witnesses:
WALTER NIMOCKS,
JOHN G. MANAHAN.